United States Patent [19]

Ishigaki

[11] 3,994,318

[45] Nov. 30, 1976

[54] PILOT-CONTROLLED ELECTROMAGNETIC VALVE

[75] Inventor: Tsuneo Ishigaki, Soka, Japan

[73] Assignee: Shoketsu Kinzoku Kogyo Kabushiki Kaisha, Tokyo, Japan

[22] Filed: June 20, 1975

[21] Appl. No.: 588,705

[30] Foreign Application Priority Data

June 29, 1974 Japan.......................... 49-76901[U]

[52] U.S. Cl.............................. 137/630.14; 251/30; 251/45
[51] Int. Cl.² ........................................ F16K 31/06
[58] Field of Search ............ 251/30, 45; 137/630.14

[56] References Cited
UNITED STATES PATENTS

| | | | |
|---|---|---|---|
| 2,502,256 | 3/1950 | Harding, Jr.................... | 137/630.14 |
| 2,990,155 | 6/1961 | Selinder................................ | 251/30 |
| 3,154,285 | 10/1964 | Houle .................................. | 251/30 |

Primary Examiner—Arnold Rosenthal
Attorney, Agent, or Firm—James C. Haight

[57] ABSTRACT

A pilot-controlled electromagnetic valve having a pilot valve mounted on a member which is supported movably relative to a solenoid plunger and a main valve and connected to the plunger through a spring such that a pilot orifice is opened when the plunger approaches a fixed core of the solenoid undergoing a stronger magnetic pull.

7 Claims, 6 Drawing Figures

PILOT-CONTROLLED ELECTROMAGNETIC VALVE

BACKGROUND OF THE INVENTION

This invention relates generally to electromagnetic valves, and more particularly to a pilot-controlled electromagnetic two-way valve which can be operated reliably by means of a solenoid of a small size irrespective of the conditions of pressure differential existing between the fluid on the primary and secondary sides of the valve.

It is known to provide pilot control means in electromagnetic valves as an expedient to lessen the burden which would be imposed on the solenoid in operations under high pressure conditions. The pilot-controlled electromagnetic or solenoid-operated valves which operate even under conditions of zero pressure differential are also known, for example, from U.S. Pat. No. 3,208,716. In the conventional electromagnetic valves of the class mentioned, a valve or closure means for opening and closing a pilot fluid passage is usually provided on a core plunger of the solenoid to open the pilot valve directly by the action of the core plunger. Actuation of the electromagnetic valve operating means or solenoid takes place when the core plunger is in its lowest position distant from a fixed core or plug of the solenoid. This means that it is necessary to employ a solenoid device of a large size to cope with operations involving great pressure differentials between the fluid on the primary and secondary sides of the valve, due to the particular magnetic attraction characteristic of the solenoid that the magnetic pull on the core plunger is weak at the lowest position remote from the fixed core and increases as the plunger approaches the fixed core or plug.

SUMMARY OF THE INVENTION

It is an object of the present invention to provide a pilot-controlled electromagnetic two-way valve which will eliminate the above-mentioned drawback of the conventional electromagnetic valves of the same class.

It is a more specific object of the invention to provide a pilot-controlled electromagnetic two-way valve which has a pilot valve provided on a movable member which is associated with the core plunger of the solenoid such that the pilot valve port is opened when the plunger approaches the fixed core of the solenoid and subject to a greater magnetic pull.

It is another object of the invention to provide a pilot-controlled electromagnetic valve which can be operated reliably by means of a small-sized solenoid device over a wide pressure differential range extending from zero to extremely high pressure differential conditions.

It is a further object of the invention to provide a pilot-controlled electromagnetic valve which can preclude burning of the solenoid coil and losses due to overcurrent.

In one preferred form of the invention, the pilot-controlled electromagnetic valve comprises: a casing having a primary port, a secondary port, and a main fluid passage between said primary and secondary ports, the wall of said main fluid passage forming a main valve seat; a main valve member movable toward and away from said main valve seat to open and close said main fluid passage; a means for defining a fluid working chamber behind said main valve member from said main fluid passage; a pilot orifice provided in said main valve member; a pilot valve seat provided on said main valve member around said pilot orifice; a solenoid including a fixed core and a plunger movable toward and away from said pilot orifice and having at the lower end thereof a spring seat in the form of an annular flange; a hollow movable member loosely fitted around the lower end of said plunger including said spring seat and having an annular flange at the lower end thereof; a pilot valve member securely mounted at the lower end of said movable member opposingly to said pilot valve seat; a compression spring mounted around the lower end of said plunger between an upper end wall of said movable member and said spring seat which is compressible to allow said plunger to move upwardly independently of said main and pilot valves; and a catcher member securely mounted on said main valve member at a predetermined distance from said flange at the lower end of said movable member and engageable therewith to lift said main valve member.

With the valve construction according to the invention, the main valve is lifted directly by the core plunger to open the main fluid passage only when a small pressure differential exists between the fluid on the primary and secondary sides of the valve, while in a case where there is a great pressure differential the valve is opened by the fluid pressure acting on the main valve per se. In other words, the valve can be reliably operated by a solenoid of a small size over a very wide pressure differential range from zero to extremely large pressure differential conditions. In this connection, the conventional direct-acting type valve constructions have no problem in opening the valve as long as the pressure differential is very small or zero but have to resort to a solenoid of a large size to lift the main or pilot valve under conditions of great pressure differentials for the reasons stated hereinbefore. In contrast, the valve of the invention is constructed to lift the pilot and main valves when the plunger has approached the fixed core or reached a point in the magnetic range of the solenoid where a sufficiently strong pull is exerted on the plunger. In addition, as the core plunger is associated with the main and pilot valves without use of rigid connections, there is no possibility of burning the solenoid coil even when the main or pilot valve is stuck or reluctant to move for some reason. Furthermore, the losses due to overcurrent can be precluded as the plunger can move independently of the main and pilot valves.

The above and other objects, features and advantages of the invention will become apparant from the following description and the appended claims, taken in conjunction with the accompanying drawings showing by way of example a preferred embodiment of the invention.

DESCRIPTION OF PREFERRED EMBODIMENT

Figure 1:
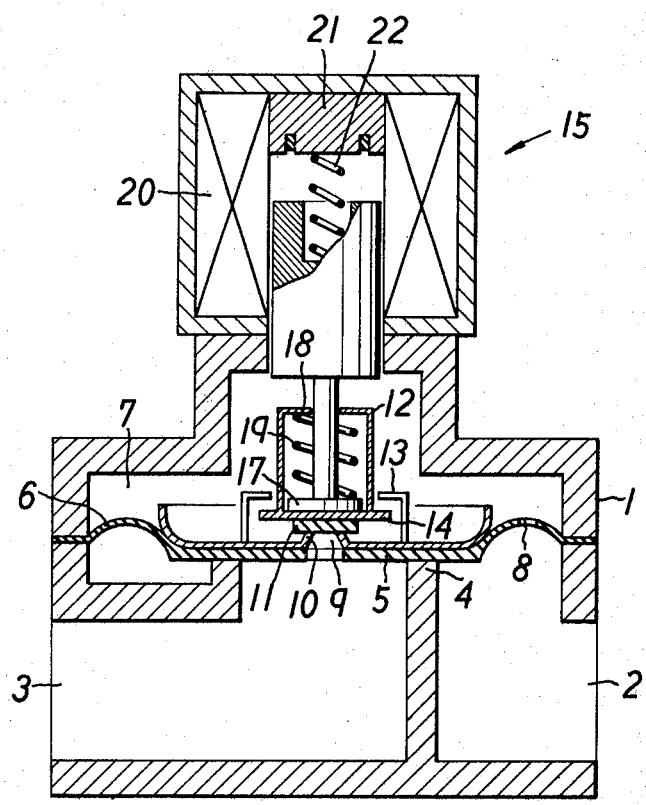
FIG. 1 is a diagrammatic sectional view of a pilot-controlled electromagnetic two-way valve embodying the present invention.

A preferred embodiment of the invention will now be described with reference to the accompanying drawing. Referring first to FIG. 1, the pilot-controlled electromagnetic two-way valve according to the invention includes a casing 1 with a primary port 2 to which a pressurized fluid is supplied and a secondary port 3 through which the fluid is discharged. A fluid passage with a valve seat 4 is provided between the primary and secondary ports 2 and 3. Disposed oppositely to the valve seat 4 is a main valve 5 which is supported within the casing 1 by means of a diaphragm 6, with diaphragm 6 defining a fluid working chamber 7 on the side remote from the valve seat 4.

The diaphragm 6 is provided with an orifice or bleed 8 through which the fluid from the primary port 2 is introduced into the fluid working chamber 7. The main valve 5 is provided with a pilot orifice 9 through which the fluid in the fluid working chamber 7 is discharged to the secondary port 3, the areas of the orifices 8 and 9 being in the relation of $S_1 < S_2$ where $S_1$ represents the effective area of the orifice 8 and $S_2$ the effective area of the orifice 9.

In order to control the opening and closing of the pilot orifice 9, a pilot valve seat 10 is provided on the main valve 5 around the orifice 9, for sealing engagement with pilot valve 11 which is mounted at the lower end of a hollow cylindrical movable member 12. The movable member 12 is provided with an annular flange 14 for abutting engagement with a catcher 13 in the form of a ring of an inverted L-shape which is fixedly mounted on the main valve at a predetermined distance from the flange 14 of the movable member 12 for limiting the movement of the movable member 12 relative to the main valve 5 to a stroke of a predetermined length which is necessary to open the pilot orifice 9.

The movable member 12 is loosely fitted around the lower end of the plunger 16 and connected thereto through a compression spring 19 which is interposed between a spring seat 17 in the form of a circular flange at the lower end of the plunger 16 and an upper end wall 18 of the movable member 12, thereby to lift the movable member 12 as the core plunger 16 is pulled by the solenoid 15. When the coil 20 of the solenoid 15 is de-energized, the plunger 16 is held in the lowermost position pressing the pilot valve 11 on the movable member 12 against the pilot valve seat 10 on the main valve 5. Upon energizing the solenoid coil 20, the plunger 16 is attracted against the action of a return spring 22 toward a fixed core or plug 21 to lift the main valve 5 up to the end of its stroke.

When the solenoid 15 is in the de-energized state as shown in FIG. 1, the pressurized fluid is introduced into the fluid working chamber 7 from the primary port 2 through the orifice 8 in the diaphragm 6. In this instance, orifice 9 is closed by the pilot valve 11 which is pressure seated on the pilot valve seat 10, so that the fluid pressure in the fluid working chamber 7 has no way to escape and maintains a fluid pressure $P_3$ which is substantially the same as the fluid pressure $P_1$ on the primary side of the valve. Thus, the main valve 5 is held in the close position.

Figure 2:
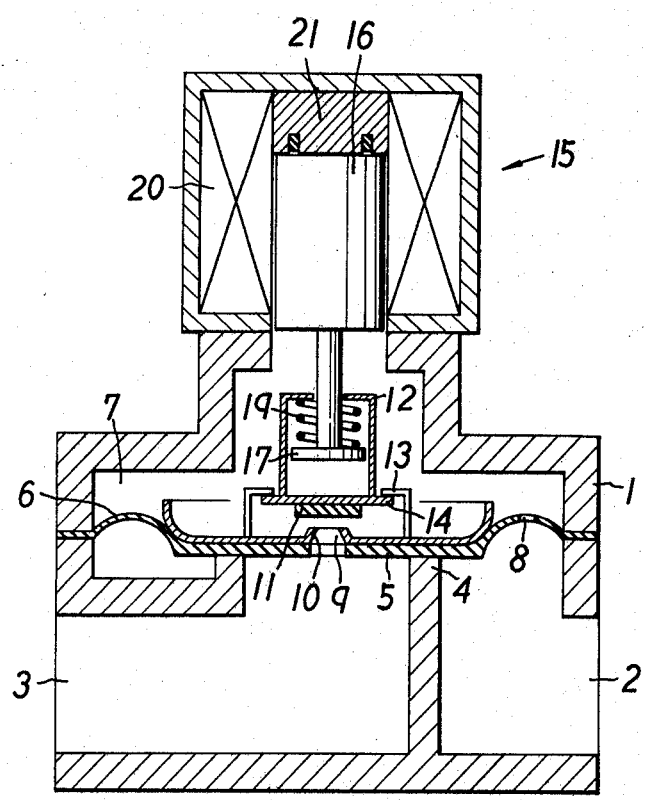
FIG. 2 is a view similar to FIG. 1 but showing the pilot valve in an open position.

Under these circumstances, if the coil 20 of the solenoid 15 is energized to attract the plunger 16 toward the fixed core 21, the plunger 16 tends to lift the movable member 12 through the spring 19 which is interposed between the flange 17 at the lower end of the plunger 16 and the upper end wall 18 of the movable member 12. In this instance, however, the pilot valve 11 on the movable member 12 is held against the pilot valve seat 10 by a force $f_1 = P_3 \times S_2$ where $P_3$ stands for the fluid pressure within the pressure chamber 7 and $S_2$ stands for the effective area of the discharging orifice 9. Therefore, when $f_1 > f_2$ ($f_2 = k \times \delta$ where $k$ is the spring constant and $\delta$ is the spring flexure), that is to say, when the force $f_2$ which tends to lift the movable member 12 is smaller than the above-mentioned force $f_1$, the pilot valve 11 cannot disengage from the pilot valve seat 10. However where $f_1 < f_2$, the pilot valve 11 disengages to open the orifice 9 as shown in FIG. 2.

Upon uncovering the orifice 9, the pressurized fluid within the fluid working chamber 7 is allowed to flow out to the secondary port 3, so that the pressure $P_3$ of the chamber 7 becomes lower than the pressure $P_1$ on the primary side and approaches the level $P_2$ on the secondary side. As a result, the main valve 5 is lifted to open the main fluid passage due to the pressure differential between the fluid in the pressure chamber 7 and on the primary side. In this connection, as soon as the flange 14 of the movable member 12 is abutted against the upper end of the catcher 13 on the main valve 5, the main valve 5 is lifted together by the cooperative action of the spring 19 and the magnetic pull which is exerted on the plunger 16.

In the above-described valve opening operation, if there is almost no pressure differential $\Delta P$ between the fluid on the primary and secondary sides of the valve, that is, between $P_1$ and $P_2$, the force $f_1$ which acts on the pilot valve 11 based on the fluid pressure $P_3$ approximates to zero value. In this instance, no great force is required for the electromagnetic actuator 15 to lift the movable core plunger 16 and the movable member 12. The plunger 16 and the movable member 12 are lifted together without compressing the spring 19. In the course of the upward stroke of the plunger 16, the flange 14 of the movable member 12 and the catcher 13 on the main valve 5 are brought into abutting engagement with each other, so that the main valve 5 is lifted together with the movable member 12 by the solenoid 15. Since $\Delta P \approx 0$ and the main valve 15 is almost free from the influences of the fluid pressure as mentioned hereinbefore, the solenoid 15 is not required to exert an especially large attractive force in opening the valve.

Where the fluid pressure $P_1$ on the primary side is higher than the fluid pressure $P_2$ on the secondary side ($P_1 > P_2$), the fluid pressure $P_3$ within the fluid working chamber 7 becomes higher due to the fluid which is introduced through the orifice 8, accordingly increasing the force $f_1$ ($= P_3 \times S_2$) which acts on the pilot valve 11. Under these circumstances, if the coil 20 of the solenoid 15 is energized to attract the plunger 16 toward the fixed core 21, the movable member 12 which carries the pilot valve 11 is not immediately caused to move upwardly but instead the spring 19 is compressed. As the spring 19 is flexed to a greater degree to have a force $f_2$ greater than $f_1$ ($f_1 < f_2$), the pilot valve 11 is caused to disengage from the pilot valve seat 10.

As soon as the pilot valve is lifted, the fluid within the fluid working chamber 7 is vented to the secondary port 3 through the orifice 9 to lower the pressure of the chamber 7, and the main valve 5 is held in the open position by the action of the fluid pressure on the primary side.

Figure 3:
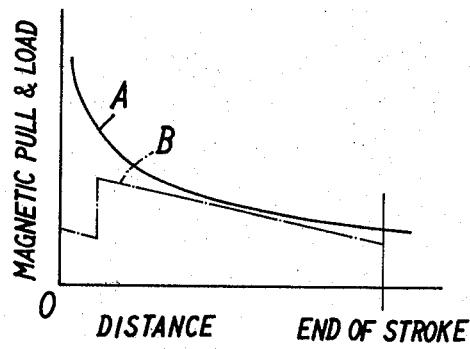
FIG. 3 is a graphic illustration showing the magnetic attraction characteristics of the solenoid and the load on the core plunger in relation with the distance of stroke of the plunger.

FIG. 3 graphically illustrates at A a curve of the magnetic attraction characteristics of the solenoid and at B a curve of the load as imposed on the spring reaction. As will be clear from this graph, the magnetic attraction characteristics of the solenoid 15 can be utilized most effectively by opening the pilot valve 11 when the distance between the plunger and the fixed core is reduced to exert a greater magnetic pull on the plunger 16, allowing the plunger 16 simply to compress the spring 19 in the initial stage of the upward stroke of the plunger where the magnetic pull is relatively weak. This means that the valve can be operated reliably with use of a solenoid of a small size, as mentioned hereinbefore, even where a great valve operating force is normally required due to a high fluid pressure prevailing in the chamber 7.

Figure 4:
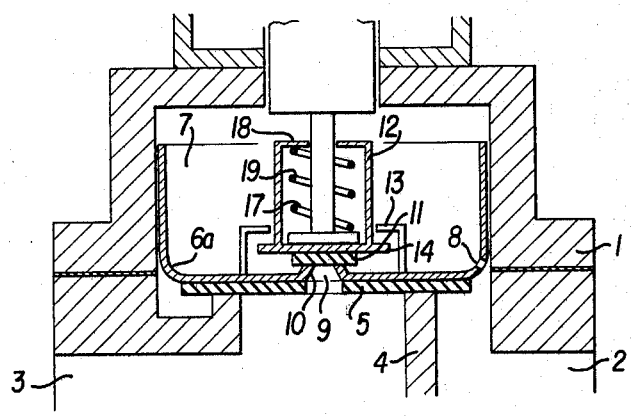
FIG. 4 is a partial diagrammatic sectional view of a device similar to that of FIG. 1 but in which the fluid working chamber is defined by a piston-cylinder.
Figure 5:
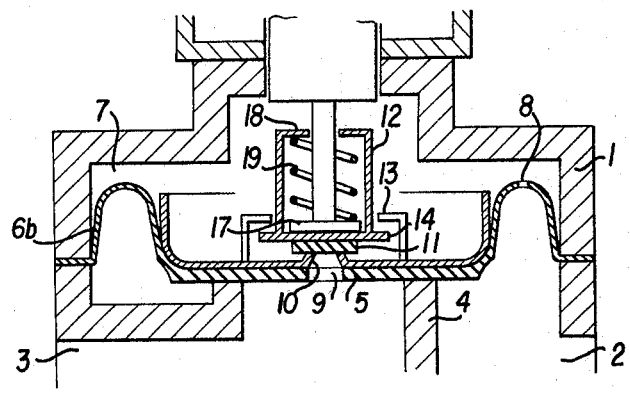
FIG. 5 is a similar view of a device wherein the fluid working chamber is defined by a bellowphragm.
Figure 6:
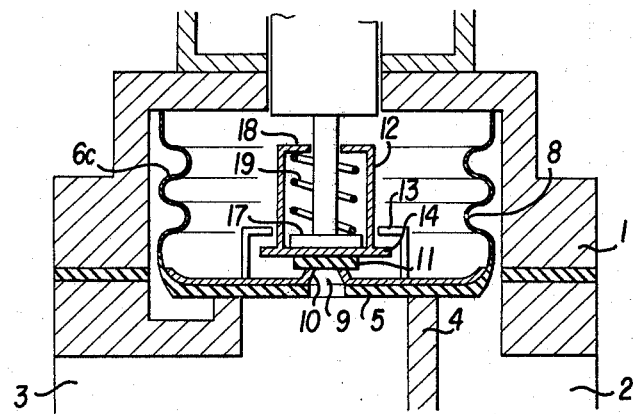
FIG. 6 is a similar view of another device wherein the fluid working chamber is defined by a bellows.

In the embodiment just described, the diaphragm is exemplarily shown as the defining means, but other means, such as piston-cylinder, bellowphragm, bellows, etc., may be substituted therefor. Illustrative variations are shown in FIGS. 4 through 6 wherein the diaphragm 6 of FIG. 1 and FIG. 2 is replaced with a piston-cylinder 6a in FIG. 4, a bellowphragm 6b in FIG. 5 and a bellows 6c in FIG. 6.

It will be understood from the foregoing description that the valve construction according to the invention can suitably attain the various objects as set forth hereinbefore. While a preferred embodiment of the invention has been described, the invention is not limited to the particular details shown and described herein and is susceptible to various changes and modifications without departing from the spirit and scope of the invention as defined in the appended claims.

What is claimed is:

1. A pilot-controlled electromagnetic valve, comprising: a casing having a primary port, a secondary port and a main fluid passage between said primary and secondary ports, the wall of said main fluid passage forming a main valve seat;

a main valve member movable toward and away from said main valve seat to open and close said main fluid passage;

means for defining a fluid working chamber behind said main valve member from said main fluid passage; a pilot orifice provided in said main valve member;

a pilot valve seat provided on said main valve member around said pilot orifice;

a solenoid including a fixed core and a plunger movable toward and away from said pilot orifice and having at the lower end thereof a spring seat in the form of an annular flange;

a hollow movable member loosely fitted around the lower end of said plunger including said spring seat and having an annular flange at the lower end thereof;

a pilot valve member securely mounted at the lower end of said movable member opposingly to said pilot valve seat;

a compression spring mounted around the lower end of said plunger between an upper end wall of said movable member and said spring seat and compressible to allow said plunger to move upwardly of said main and pilot valves; and a catcher member securely mounted on said main valve member at a predetermined distance from said flange at the lower end of said movable member and engageable therewith to lift said main valve member.

2. A pilot-controlled electromagnetic valve as defined in claim 1, wherein said movable member is in the form of a hollow cylinder having an annular flange at the lower end thereof.

3. A pilot-controlled electromagnetic valve as defined in claim 1, wherein said catcher member is in the form of a ring of an inverted L-shape in section.

4. A pilot-controlled electromagnetic valve as defined in claim 1, wherein said defining means is in the form of a diaphragm.

5. A pilot-controlled electromagnetic valve as defined in claim 1, wherein said defining means is in the form of a piston-cylinder.

6. A pilot-controlled electromagnetic valve as defined in claim 1, wherein said defining means is in the form of a bellowphragm.

7. A pilot-controlled electromagnetic valve as defined in claim 1, wherein said defining means is in the form of a bellows.

* * * * *